(No Model.)
F. M. AUSTEN.
BOILER FOR HEATING FRUIT IN JARS.
No. 315,377. Patented Apr. 7, 1885.
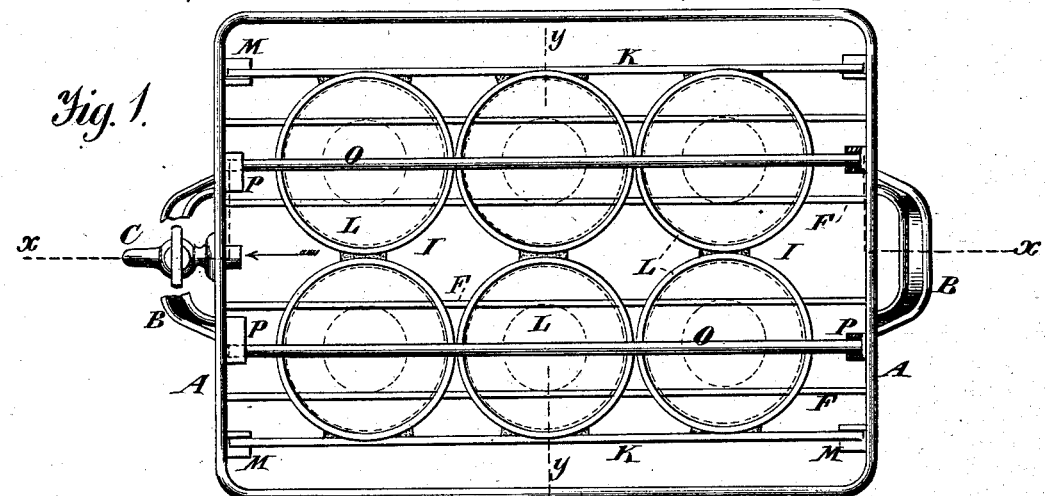
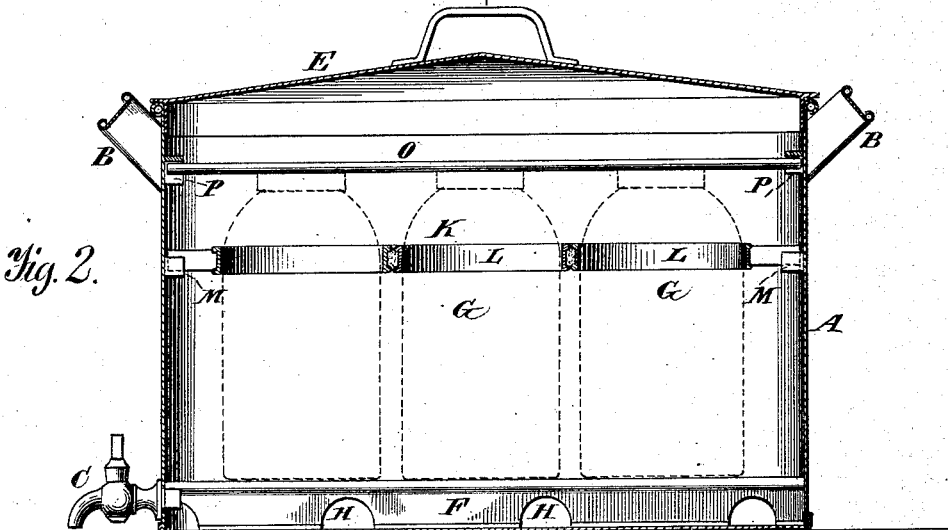
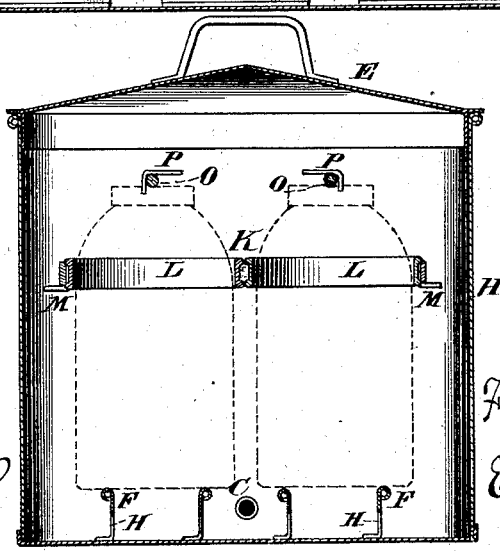
Witnesses.
A. Ruppert
J. W. Garner
Inventor:
Frances M. Austen
by
England & Nye.
Attys.

UNITED STATES PATENT OFFICE.

FRANCES M. AUSTEN, OF DICKINSON, NEW YORK.

BOILER FOR HEATING FRUIT IN JARS.

SPECIFICATION forming part of Letters Patent No. 315,377, dated April 7, 1885.

Application filed September 10, 1884. (No model.)

*To all whom it may concern:*

Be it known that I, FRANCES M. AUSTEN, a citizen of the United States, residing at Dickinson, in the county of Broome and State of New York, have invented certain new and useful Improvements in Boilers for Heating Fruit in Jars, of which the following is a specification, reference being had therein to the accompanying drawings.

My invention relates to an improvement in boilers for heating fruit in jars; and it consists in the peculiar construction and combination of devices that will be more fully set forth hereinafter.

The object of my invention is to provide a boiler with means for supporting the fruit-jars at a slight distance above the bottom of the boiler, so as to permit a free circulation of the boiling water around the jars, and, further, to provide means for holding the jars firmly in place against displacement by the agitation of the boiling water.

In the accompanying drawings, Figure 1 is a top plan view of my boiler with the cover removed. Fig. 2 is a vertical longitudinal section of the same on the line $x\ x$ of Fig. 1. Fig. 3 is a vertical cross-section on the line $y\ y$ of Fig. 1.

A represents the boiler, which is preferably of the form here shown, and which is constructed of tin, copper, or other suitable sheet metal. Handles B are secured to its ends near the upper edge, and a faucet, C, is located near the bottom, as shown.

E represents a cover, which is of the ordinary construction.

Ribs F extend longitudinally on the inner side of the bottom of the boiler, and extend above it a sufficient distance to support the jars G (which are indicated in dotted lines in the various figures) at a distance above the bottom of the boiler, and thereby allow the hot water to be under the bottoms of said jars for the purpose of preventing their contents from becoming overheated or burned, as might be the case should the jars rest immediately on the bottom. Openings H are made in these sides, so as to admit of a ready circulation of the boiling water.

I represents a frame that is composed of the rods K and the circular collars L. The ends of the rods I are supported in brackets M, that project inwardly from the ends of the boiler a slight distance above the center thereof. The fruit-jars as they are placed in the boiler are each passed through one of the rings or collars L, which are of a size corresponding to the diameter of said jars, and thereby the jars are held in place separate from each other, and any lateral displacement or other movement of the jars consequent to the agitation of the boiling water or caused by moving the boiler is prevented, and thereby the jars are prevented from being brought into forcible contact with each other and broken.

In order to prevent the jars from being agitated vertically by the boiling water, should their contents not be sufficiently heavy for this purpose, I provide the rods O, which extend across the tops of the jars and have their ends supported in the ears P. These rods O thus lock the jars firmly in place, as will be very readily understood. The faucet C enables the water to be drawn from the boiler when desired.

Having thus described my invention, I claim—

1. The boiler having the ribs F upon its bottom to support the jars, and the brackets M, in combination with the frame I, provided with openings for admitting the upper ends of the jars, and resting upon the brackets M, for the purpose set forth, substantially as described.

2. The boiler having the ribs F upon its bottom to support the jars, and the brackets M, in combination with the frame I, provided with openings for admitting the upper ends of the jars, and resting upon the brackets M, and the rods O, supported in the ears P, all arranged for the purpose set forth, substantially as described.

In testimony whereof I affix my signature in presence of two witnesses.

FRANCES M. AUSTEN.

Witnesses:
EMANUEL WOLFF,
LILLIE CORMACK.